United States Patent
Matsuoka

(10) Patent No.: US 7,508,562 B2
(45) Date of Patent: Mar. 24, 2009

(54) MULTI-BEAM SCANNING OPTICAL SYSTEM

(75) Inventor: Shohei Matsuoka, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/054,675

(22) Filed: Mar. 25, 2008

(65) Prior Publication Data

US 2008/0239434 A1 Oct. 2, 2008

(30) Foreign Application Priority Data

Mar. 30, 2007 (JP) ............... 2007-091295

(51) Int. Cl.
*G02B 26/08* (2006.01)
(52) U.S. Cl. ...................... 359/204; 359/241
(58) Field of Classification Search ............. 359/204, 359/205, 212; 347/241, 243, 244
See application file for complete search history.

(56) References Cited

U.S. PATENT DOCUMENTS

| | | |
|---|---|---|
| 5,610,647 A | 3/1997 | Takada |
| 6,326,992 B1 * | 12/2001 | Inoue et al. .............. 347/241 |
| 2006/0126147 A1 | 6/2006 | Takakubo |
| 2007/0081218 A1 | 4/2007 | Matsuoka |
| 2007/0091405 A1 | 4/2007 | Matsuoka |
| 2007/0159675 A1 | 7/2007 | Matsuoka |
| 2007/0165100 A1 | 7/2007 | Shinozaki |

FOREIGN PATENT DOCUMENTS

JP         2001-4942      1/2001

* cited by examiner

*Primary Examiner*—Euncha P Cherry
(74) *Attorney, Agent, or Firm*—Greenblum & Bernstein, P.L.C.

(57) ABSTRACT

A multi-beam scanning optical system configured to scan a plurality of laser beams on a scanned surface in a predetermined scanning direction includes a light source emitting a plurality of laser beams from respective laser emitters spaced from each other in the predetermined scanning direction, a diverging property changing element changing a diverging property of each of the emitted laser beams, a deflector configured to be sine-functionally oscillated and to deflect each of the laser beams with the diverging property thereof as changed so as to scan each of the laser beams on the scanned surface in the predetermined scanning direction, and a scanning speed controlling element configured to control a scanning speed at which each of the laser beams deflected by the deflector is scanned on the scanned surface. The multi-beam scanning optical system is configured to satisfy a predetermined condition.

8 Claims, 3 Drawing Sheets

MULTI-BEAM SCANNING OPTICAL SYSTEM

BACKGROUND OF THE INVENTION

The following description relates to one or more multi-beam scanning optical systems configured to be incorporated in an image forming device.

Recently, in an image forming device such as a laser copy machine and a laser printer, there has been used for a copying operation or drawing operation, a so-called multi-beam scanning optical system. The multi-beam scanning optical system is configured to deflect a plurality of laser beams emitted by a light source with a deflector so as to scan the laser beams on a drawn surface in a predetermined direction (hereinafter referred to as a main scanning direction), taking on-off control to be synchronized with a modulated signal generated based on drawing data. In such an image forming device, a copying operation or drawing operation for forming a desired image is performed by translating the drawn surface exposed by the multi-beam scanning optical system in a direction perpendicular to the main scanning direction of each laser beam (hereinafter referred to as an auxiliary scanning direction).

In a conventional multi-beam scanning optical system, a polygon mirror provided with a plurality of mirror surfaces is generally employed as a deflector. However, in the multi-beam scanning optical system, the polygon mirror and a motor unit for rotating the polygon mirror occupy a very large space and cause a high cost of the system.

Thus, there has been proposed a multi-beam scanning optical system which employs a micro-mirror device, instead of the polygon mirror, as a deflector. The micro-mirror is fabricated based on a MEMS (Micro Electro Mechanical Systems) Technology that is recently coming into practical use, and is capable of quick response. The multi-beam scanning optical system with the micro-mirror device employed as a deflector can be more downsized at lower cost than the configuration with the polygon mirror employed as a deflector. Such a multi-beam scanning optical system is proposed, for example, in a paragraph 0138 of Japanese Patent Provisional Publication No. 2001-4942 (hereinafter referred to as '942 Publication).

However, in '942 Publication, there is only a general abstract description that a micro-mirror device may be used as substitute for the polygon mirror. Namely, in '942 Publication, there is no disclosure regarding a specific configuration of the multi-beam scanning optical system which provides favorable optical performances in case where the micro-mirror device is actually be used as a deflector.

SUMMARY OF THE INVENTION

The present invention is advantageous in that there can be provided one or more improved multi-beam scanning optical systems that can provide favorable optical performances and perform high-definition drawing in case where a plurality of laser beams are concurrently scanned with a micro-mirror employed as a deflector.

According to aspects of the present invention, there is provided a multi-beam scanning optical system configured to scan a plurality of laser beams on a scanned surface in a predetermined scanning direction, which includes a light source that includes a plurality of laser emitters spaced from each other in the predetermined scanning direction, each of the plurality of laser emitters being configured to emit a laser beam, a diverging property changing element configured to change a diverging property of each of the laser beams emitted by the light source, a deflector configured to be sine-functionally oscillated and to deflect each of the laser beams with the diverging property thereof changed by the diverging property changing element so as to scan each of the laser beams on the scanned surface in the predetermined scanning direction, and a scanning speed controlling element configured to control a scanning speed at which each of the laser beams deflected by the deflector is scanned on the scanned surface. The multi-beam scanning optical system is configured to satisfy a condition (1):

$$\frac{\Delta_1 \tan(W/4K\varphi)}{f} < 0.01 \tag{1}$$

where $\Delta_1$ represents a distance in the predetermined scanning direction between any two adjacent laser emitters of the light source, f represents a focal length of the diverging property changing element, W represents a scanning width of each of the laser beams on the scanned surface, K represents a scanning coefficient of the scanning speed controlling element, and $\phi$ represents an angular amplitude of the deflector.

Optionally, the diverging property changing element may converge each of the laser beams at least in the predetermined scanning direction. In this case, the multi-beam scanning optical system may be configured to satisfy conditions (2) and (3):

$$f > -K/M \tag{2}$$

$$\frac{W}{2\sin\alpha} > f(2 - M/m) - K/m > \frac{dW}{2K\sin\alpha}, \text{ and} \tag{3}$$

where M represents a magnification of the entire multi-beam scanning optical system in the predetermined scanning direction, a represents an angle, on a scanning plane of the laser lights deflected by the deflector in the predetermined scanning direction, between an optical axis of an optical system provided between the light source and deflector and an optical axis of the scanning speed controlling element, m represents a magnification of the scanning speed controlling element in the predetermined scanning direction, and d represents a distance between the deflector and a first surface of the scanning speed controlling element.

Optionally, the multi-beam scanning optical system may be configured to satisfy a condition (4):

$$-K/M > 6 \tag{4}$$

Still optionally, the multi-beam scanning optical system may be configured to satisfy conditions (5) and (6):

$$0.15 < m < 1.5 \tag{5}$$

$$W/2 < K \tag{6}$$

Optionally, the diverging property changing element may include a diverging property changing lens group.

Optionally, the deflector may include a micro-mirror device.

Optionally, the scanning speed controlling element may include a scanning speed controlling lens group.

BRIEF DESCRIPTION OF THE ACCOMPANYING DRAWINGS

FIG. 1 schematically shows a configuration of a multi-beam scanning optical system in an embodiment according to one or more aspects of the present invention.

DETAILED DESCRIPTION OF THE EMBODIMENTS

Figure 1:
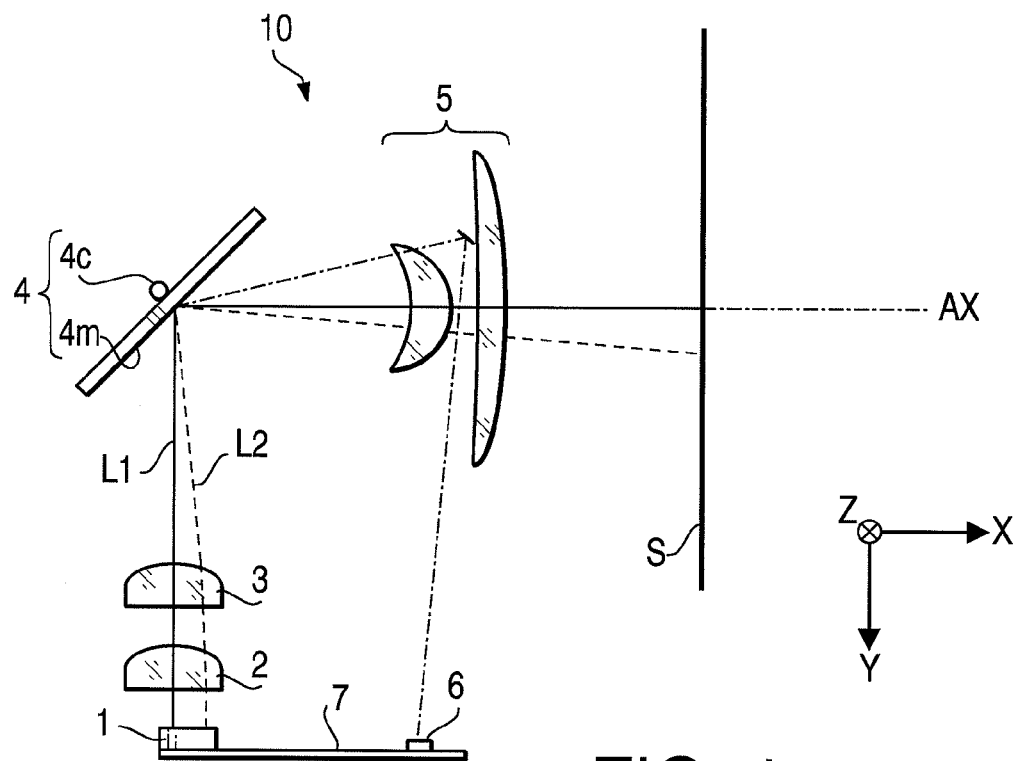

FIG. 1 schematically shows a configuration of a multi-beam scanning optical system 10 in an embodiment according to aspects of the present invention. The multi-beam scanning optical system 10 is provided, for example, in an image forming device. As shown in FIG. 1, the multi-beam scanning optical system 10 includes a light source 1, coupling lens group 2, cylindrical lens group 3, a micro-mirror device 4, and scanning lens group 5. A reference character "S" shown in FIG. 1, for example, indicates a scanned surface of a photoconductive drum of the image forming device. In addition, a reference character "AX" represents a center axis of the multi-beam scanning optical system 10. Each optical element included in the multi-beam optical system 10 is arranged such that the center axis AX in case where an optical path is developed conforms with an optical axis of each optical element. Namely, FIG. 1 is a cross section of the multi-beam scanning optical system 10 along a plane (main scanning plane) including a main scanning direction and the center axis AX.

It is noted that, in the following description, a main scanning direction is defined as Y direction, an auxiliary scanning direction as Z direction, and a direction perpendicular to the Y and Z directions, that is, an optical axis direction of the scanning lens group 5 as X direction. A direction used for explanation of each element other than the scanned surface S is determined based on a direction on the scanned surface S.

Figure 2:
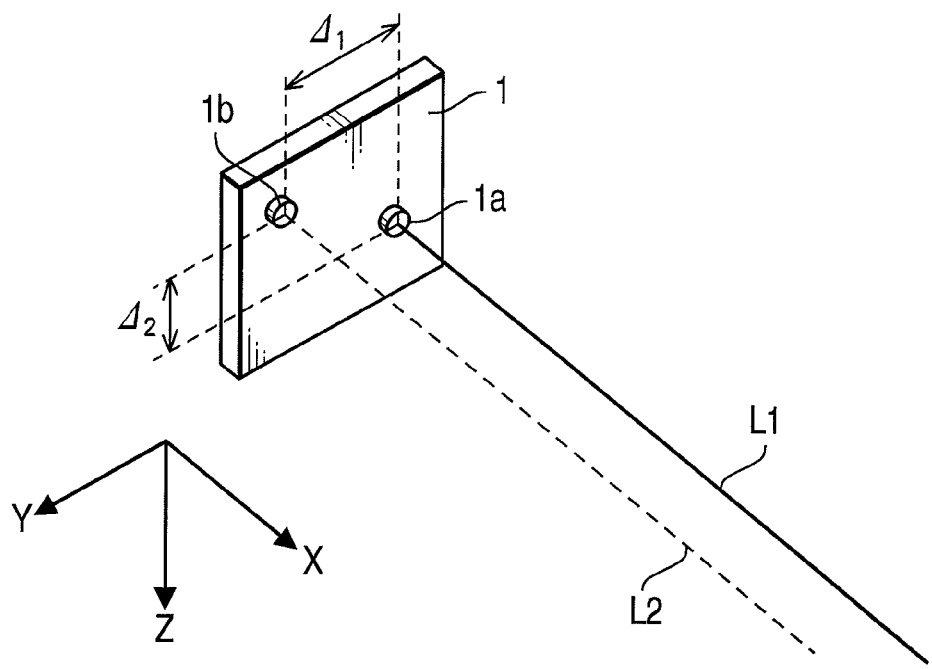
FIG. 2 is a perspective view schematically showing a light source in the embodiment according to one or more aspects of the present invention.

FIG. 2 is a perspective view schematically showing the light source 1. As shown in FIG. 2, the light source 1 has a plurality of laser emitters (in this case, two laser emitters 1a and 1b) on a single chip. The light emitters 1a and 1b of the light source 1 are placed on the small chip with a minute positional difference (Δ1 or Δ2) therebetween in each of the directions Y and Z so as to scan each of the laser beams evenly in the auxiliary scanning direction on the scanned surface S with no interference between the laser beams and to perform high-definition drawing. It is noted that a laser beam emitted by the laser emitter 1a is defined as a laser beam L1, while a laser beam emitted by the laser emitter 1b is defined as a laser beam L2.

When using the multi-beam scanning optical system 10, a laser beam is scanned on the scanned surface S in a following manner. Each of the laser beams L1 and L2 emitted by the light source 1 is firstly incident onto the coupling lens group 2. The coupling lens group 2 has a power to change a diverging property of the incident laser beam. The laser beam transmitted through the coupling lens group 2 is subsequently incident onto the cylindrical lens group 3. The cylindrical lens group 3 has a power to converge the incident laser beam in the auxiliary scanning direction. The laser beam transmitted through the cylindrical lens group 3 is converged in the auxiliary scanning direction just prior to reaching the micro-mirror device 4.

The micro-mirror device 4 has a rotation shaft 4c and mirror surface 4m. The rotation shaft 4c is configured to extend in the Z direction. The mirror surface 4m of the micro-mirror device 4 is continuously oscillated around the rotation shaft 4c by a driving mechanism (not shown). More specifically, the mirror surface 4m is oscillated with a sinusoidal relationship between a rotation angle around the rotation shaft 4c and time. Namely, the mirror surface 4m of the micro-mirror device 4 is oscillated to satisfy a following equation (A):

$$\theta(t) = \varphi \sin\left(\frac{2\pi}{T}t\right) \quad (A)$$

where θ represents a tilt angle of the mirror, t represents time, φ represents an angular amplitude, and T represents an oscillation period. In this description, the above oscillation is defined as a sine oscillation.

Each of the laser beams is incident onto the mirror surface 4m so as to be directed toward the rotation shaft 4c. Then the laser beam is deflected by an angle depending on a tilt angle of the mirror which is sine-functionally oscillating, and incident onto the scanning lens group 5. It is noted that, in the present embodiment, each of the elements 2, 3, and 5 is placed such that the optical axis thereof conforms with the optical path of the laser beam L1 in case where the tilt angle of the mirror is zero. Namely, in the present embodiment, the optical path of the laser beam L1 as developed conforms with the center axis AX.

When the micro-mirror device 4 configured to sine-functionally oscillate is employed as a deflector, it is required for maintaining a constant scanning speed that the scanning lens group 5 has an arcsine property. Specifically, the scanning lens group 5 is configured to have a positive distortion as a whole, and also configured such that an image height (height of an image in the main scanning direction from an intersection on the scanned surface S with the center axis AX) y [mm] is expressed by a following equation (B):

$$y = 2\varphi \cdot f_s \sin^{-1}\left(\frac{\theta_D}{2\varphi}\right) \quad (B)$$

where $f_s$ [mm] represents a focal length of the scanning lens group 5, φ [degree] represents an angular amplitude of the micro-mirror device 4, and $\theta_D$ [degree] represents a deflection angle of the laser beam in the micro-mirror device 4. It is noted that, although the scanning lens group 5 consists of two lenses in the present embodiment, it is just an example. The scanning lens group 5 according to aspects of the present invention is not limited to such a configuration.

Each of the laser beams transmitted through the scanning lens group 5 is scanned in the main scanning direction (Y direction) on the scanned surface.

In the aforementioned multi-beam scanning optical system with the deflection mirror to deflect the plurality of laser beams by the sine oscillation thereof, there is caused a below-mentioned problem in case where the deflection mirror such as a MEMS mirror is merely employed as substitute for the polygon mirror of a conventional multi-beam scanning optical system.

Figure 3:
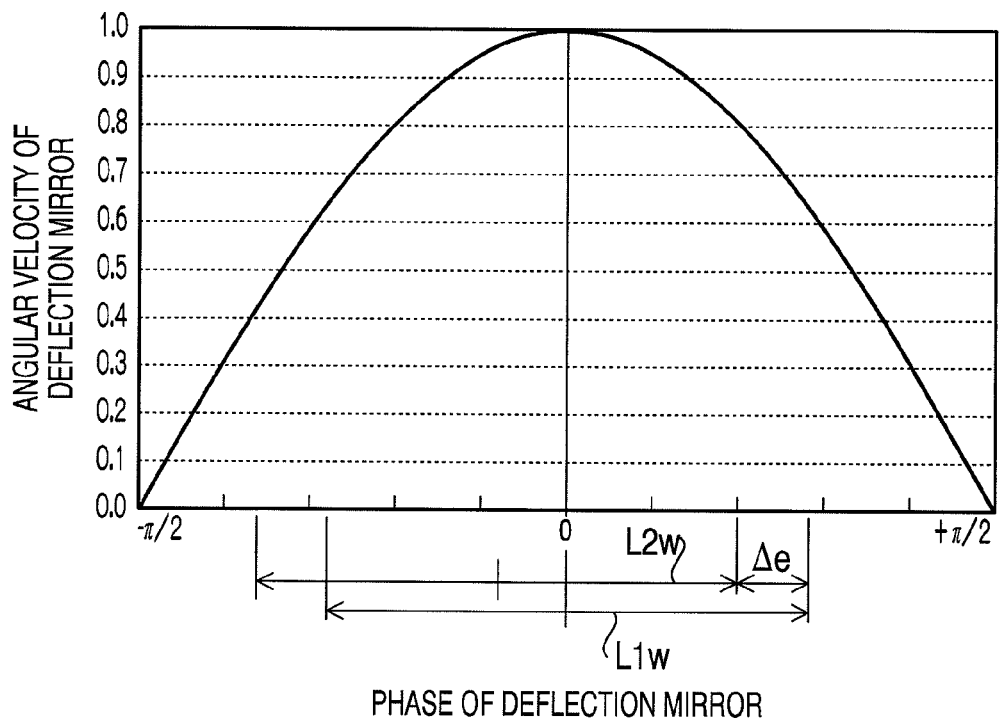
FIG. 3 shows relationship between a phase and an angular velocity of a sine functionally oscillating deflection mirror in a conventional multi-beam scanning optical system (comparative example).

FIG. 3 shows relationship between a phase and angular velocity of the deflection mirror oscillated sine-functionally in the multi-beam scanning optical system. It is noted that a vertical axis of FIG. 3 represents an angular velocity normalized on the basis of the maximum value of the angular velocity at a phase of 0. As shown in FIG. 3, the relationship between the phase and angular velocity of the deflection mirror is symmetric with respect to a line of the phase equal to zero.

Further, a range L1w shown in FIG. 3 is a range of the phase within which the laser beam L1 incident onto the sine-functionally oscillating deflection mirror is scanned in a predetermined effective scanning range. Additionally, a range L2w shown in FIG. 3 is a range of the phase within which the laser beam L2 incident onto the sine-functionally oscillating deflection mirror is scanned in a predetermined effective scanning range. Owing to the aforementioned positional difference between the laser emitters 1a and 1b, centers of the phase ranges L1w and L2w are shifted from each other. For example, let's suppose that each of the elements such as the light source 1 and deflection mirror 4 is placed such that the center of the phase range L1w conforms with a phase of zero (see FIG. 1). In this case, the center of the phase range L2w is always shifted from the center of the phase range L1w along a phase axis of FIG. 3. In FIG. 3, $\Delta e$ represents a shift amount between the phase ranges L1w and L2w.

Figure 4:
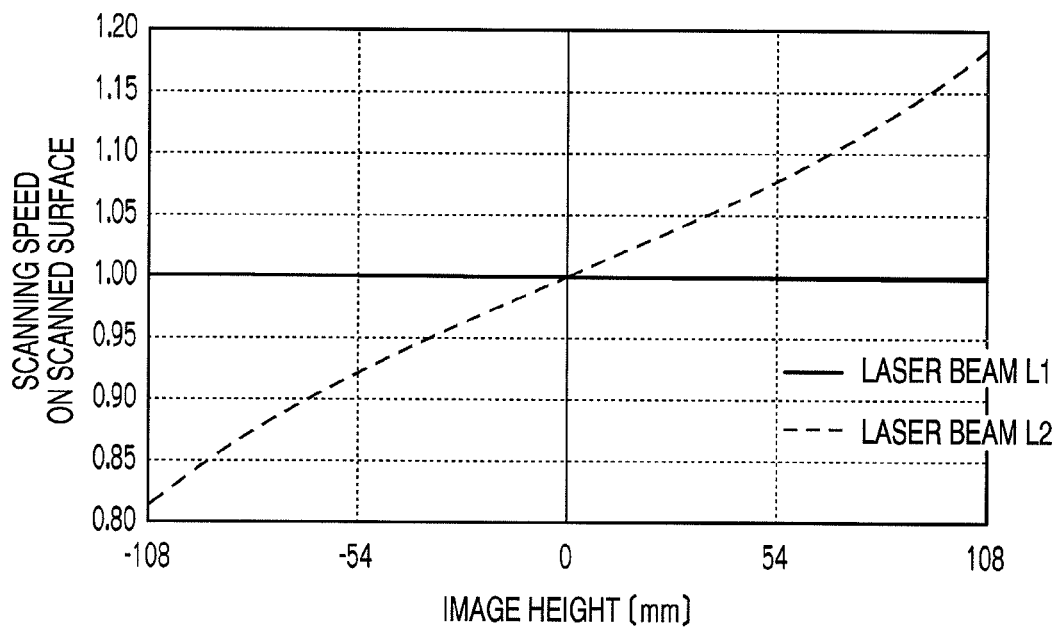
FIG. 4 shows relationship between an image height and a scanning speed on a scanned surface for each laser beam in the conventional multi-beam scanning optical system (comparative example).

FIG. 4 shows relationship between the image height and the scanning speed on the scanned surface for each of the laser beams in a state where the phase ranges L1w and L2w are shifted from each other. In FIG. 4, a solid line indicates a property of the laser beam L1, while a chain line indicates a property of the laser beam L2. It is noted that a vertical axis of FIG. 4 represents a relative speed (ratio) of the scanning speed of the laser beam L1 to that of the laser beam L2. As shown in FIG. 4, when the phase ranges L1w and L2w are shifted from each other, the scanning speeds of the laser beams L1 and L2 are different at a given image height but zero on the scanned surface. It results in density unevenness, particularly, in color unevenness in a color printer. Therefore, the multi-beam scanning optical system with the deflection mirror such as a MEMS mirror employed as a deflector is required to be configured to reduce the difference of the scanning speed between the laser beams L1 and L2 at a given image height and to achieve high-definition and high quality scanning (drawing).

In order to reduce the aforementioned difference of the scanning speed, the multi-beam scanning optical system 1 of the present embodiment is configured to satisfy a following condition (1):

$$\frac{\Delta_1 \tan(W/4K\varphi)}{f} < 0.01 \quad (1)$$

where $\Delta_1$ represents a distance in the main scanning direction between the laser emitters 1a and 1b of the light source 1, f represents the focal length of the coupling lens group 2, W represents a scanning width of each laser beam on the scanned surface S, K represents a scanning coefficient of the scanning lens group 5, and $\varphi$ represents an angular amplitude of the micro-mirror device 4. It is noted that the scanning coefficient K is a value given as $\Delta y/\Delta \theta_D$ on a paraxial axis. The scanning coefficient K is substantially equivalent to the focal length of the scanning lens group 5 when the scanning lens group 5 have a small magnification.

The condition (1) is a condition for reducing the difference between the scanning speeds of the laser beams L1 and L2 at a given image height on the scanned surface S. The condition S is derived in a following manner.

As described above, the tilt angle $\theta(t)$ of the micro-mirror device 4 at a time t is determined based on the equation (A).

$$\theta(t) = \varphi \sin\left(\frac{2\pi}{T}t\right) \quad (A)$$

The angular velocity $\omega(t)$ of the micro-mirror device 4 at the time t is expressed by a following equation (C) obtained by differentiating the above equation with respect to the time t.

$$\omega(t) = \frac{2\pi}{T}\varphi \cos\left(\frac{2\pi}{T}t\right) \quad (C)$$

Here, let's suppose that the laser beam L1 incident onto the micro-mirror 4 at the time when t=0 is converged at an image height where y=0 on the scanned surface S (namely, the intersection on the scanned surface S with the center axis AX). In this case, based on the equation (C), the angular velocity $\omega(0)$ of the micro-mirror device 4 can be written as a following equation (D).

$$\omega(0) = \frac{2\pi}{T}\varphi \quad (D)$$

In addition, at the time when t=0, the scanning speed v is determined based on a following equation (E).

$$v = 2K\omega(0) = \frac{4\pi K}{T}\varphi \quad (E)$$

In a scanning optical system, the scanning speed is required to be constant. Namely, it is ideal that a value of v is constant regardless of when the scanning is performed. Accordingly, a time $t_{max}$ when the laser beam L1 reaches a maximum image height ($y=Y_{max}$) from the center axis AX can be written as a following equation (F).

$$t_{max} = \frac{Y_{max}}{v} = \frac{TY_{max}}{4\pi K\varphi} \quad (F)$$

Based on the equations (C) and (F), an angular velocity $\omega(t_{max})$ at the maximum image height $Y_{max}$ can be written as a following equation (G).

$$\omega(t_{max}) = \frac{2\pi}{T}\varphi\cos\left(\frac{Y_{max}}{2K\varphi}\right) \quad (G)$$

Next, let's consider the laser beam L2 incident onto the micro-mirror device 4 with a minute angle difference δ from the laser beam L1. A time Δt when the laser beam L2 is converged at the image height where y=0 is expressed by a following equation (H).

$$\Delta t = \frac{2K\delta}{v} = \frac{T\delta}{2\pi\varphi} \quad (H)$$

Thus, it is understood that the laser beam L2 is scanned over an image height range of y=0~$Y_{max}$ on the scanned surface S during a time period of Δt~$t_{max}$+Δt.

Therefore, an angular velocity ω(Δt) of the micro-mirror device 4 at the time Δt when the laser beam L2 is converged at the image height where y=0 is expressed by a following equation (I).

$$\omega(\Delta t) = \omega(0) + \frac{d\omega(0)}{dt}\cdot\Delta t = \omega(0) + 0\cdot\frac{T\delta}{2\pi\varphi} = \omega(0) \quad (I)$$

In addition, an angular velocity $\omega(t_{max}+\Delta t)$ of the micro-mirror device 4 at the time Δt when the laser beam L2 is incident onto the point where y=$Y_{max}$ is expressed by a following equation (J).

$$\omega(t_{max} + \Delta t) = \omega(t_{max}) + \frac{d\omega(t_{max})}{dt}\cdot\Delta t \quad (J)$$
$$= \omega(t_{max}) + \left(\frac{2\pi}{T}\right)^2\varphi\sin\left(\frac{Y_{max}}{2K\varphi}\right)\cdot\frac{T\delta}{2\pi\varphi}$$
$$= \omega(t_{max}) + \frac{2\pi}{T\varphi}\varphi\sin\left(\frac{Y_{max}}{2K\varphi}\right)\cdot\delta$$

Here, a ratio of the angular velocities of the micro-mirror device 4 when the laser beams L1 and L2 are respectively incident onto a predetermined image height on the scanned surface is equivalent to a ratio of a scanning speed v of the laser beam L1 to a scanning speed v' of the laser beam L2 at the predetermined image height. Hence, following equations (K) and (L) are obtained.

$$v'_{(y=0)} = v\frac{\omega(\Delta t)}{\omega(0)} = v \quad (K)$$

$$v'_{(y=Y_{max})} = v\frac{\omega(t_{max} + \Delta t)}{\omega(t_{max})} \quad (L)$$
$$= v\left\{1 + \frac{2\pi}{T}\sin\left(\frac{Y_{max}}{2K\varphi}\right)\cdot\delta\bigg/\frac{2\pi}{T}\cos\left(\frac{Y_{max}}{2K\varphi}\right)\right\}$$
$$= v\left\{1 + \tan\left(\frac{Y_{max}}{2K\varphi}\right)\cdot\delta\right\}$$

Based on the equations (K) and (L), a ratio of a scanning speed at y=0 to a scanning speed at y=$Y_{max}$ is expressed by a following equation (M).

$$\frac{v'_{(y=Y_{max})}}{v'_{(y=0)}} = 1 + \tan\left(\frac{Y_{max}}{2K\varphi}\right)\cdot\delta \quad (M)$$

The closer to 1 a value given by the equation (M) is, the more constant the scanning speed of the laser beam L2 is. Namely, tan($Y_{max}$/2Kφ) corresponds to an scanning speed error of the laser beam L2 to the laser beam L1. The left expression of the condition (1) is obtained by multiplying a value obtained by substituting W/2 into $Y_{max}$ of the error tan($Y_{max}$/2Kφ) by the incident angle difference δ=$\Delta_1$/f. Thus, the left expression of the condition (1) is regarded as an incident angle error into which the scanning speed error is converted. Namely, such a design as to make a value of the left expression of the condition (1) less than 0.01 can keep the shift amount Δe between the phase ranges L1w and L2w, which is shown in FIG. 3, to the minimum. Consequently, it is possible to suppress the scanning speed difference between the laser beams L1 and L2.

Furthermore, in order to enhance the aforementioned effect with the entire system being downsized, the multi-beam scanning optical system of the present embodiment is configured such that each laser beam is converged in the main scanning direction through the coupling lens group 2 and then incident onto the micro-mirror device 4, and such that following conditions (2) and (3) are satisfied:

$$f > -K/M \quad (2)$$

$$\frac{W}{2\sin\alpha} > f(2 - M/m) - K/m > \frac{dW}{2K\sin\alpha} \quad (3)$$

where M represents a magnification of the entire multi-beam scanning optical system 10 in the main scanning direction, α represents an angle, on the main scanning plane, between an optical axis of the optical system (specifically, the coupling lens group 2 and cylindrical lens group 3) provided between the light source 1 and polygon mirror 4 and the optical axis of the scanning lens group 5, m represents a magnification of the scanning lens group 5 in the main scanning direction, and d represents a distance from the deflection mirror 4 to a first surface of the scanning lens group 5.

The condition (2) is a condition to appropriately regulate a level of convergence of each laser beam. Since each laser beam converged by the coupling lens group 2 is incident onto the micro-mirror device 4, the focal length of the coupling lens group 2 is not definitely determined depending on the focal length of the scanning lens group 5. More specifically, even though the focal length of the scanning lens group 5 is set to be short so as to downsize the multi-beam scanning optical system 10, the focal length of the coupling lens group 2 is set to be such an appropriate value as to enhance the aforementioned effect of reducing the scanning speed difference, that is, such a value as to satisfy the condition (2).

In addition, the condition (3) is a condition to make a optical path between the light source 1 to the micro-mirror device 4 shorter than the scanning width on the scanned surface S. Specifically, in general, it is aimed to when downsizing a multi-beam scanning optical system that the system does not extend beyond a width of an image formed medium such as a paper usable in the image forming device with the system incorporated therein. The left part in the condition (3) gives a critical value for making a dimension between the light source 1 and the micro-mirror device 4 shorter than the width of the paper (namely, scanning width).

Additionally, in the multi-beam scanning optical system, generally, part of a laser beam deflected by the micro-mirror device 4 is detected as light for signal synchronization by a light receiving sensor. The light receiving sensor is required to be attached onto a control board on which the light source 1 is mounted so as to reduce the number of components of the multi-beam scanning optical system and attain the downsizing of the system. For reference, in FIG. 1, the light for signal synchronization is indicated by an alternate long and short dash line, and reference characters 6 and 7 are given to the light receiving sensor and control board, respectively. As shown in FIG. 1, in order to introduce the light for signal synchronization to the light receiving sensor 6 mounted on the control board 7, it is required to make the dimension between the light source 1 and micro-mirror device 4 longer than a width of the scanning lens group 5 (particularly, the lens at the micro-mirror device 4 side) in the main scanning direction. The right part of the condition (3) gives a critical value for making the dimension between the light source 1 and micro-mirror device 4 longer than the width of the scanning lens group 5 (particularly, the lens at the micro-mirror device 4 side) in the main scanning direction. Incidentally, when a value of the center part is less than the value given by the right part in the condition (3), the dimension between the light source 1 and micro-mirror device 4 is shorter than the width of the scanning lens group 5 (particularly, the lens at the micro-mirror device 4 side) in the main scanning direction. In this case, it is unfavorable that the light for signal synchronization is blocked by the scanning lens group 5.

In order to satisfy the aforementioned conditions (1) to (3), it is desired to appropriately set each parameter so as to satisfy following conditions (4) to (6).

$$-K/M > 6 \quad (4)$$

$$0.15 < m < 1.5 \quad (5)$$

$$W/2 < K \quad (6)$$

Unless each parameter is set so as to satisfy the above conditions (4) to (6), it is unfavorably difficult to satisfy each of the conditions (1) to (3). Further, since the scanning lens group 5 is configured with too high power and too large field angle, it is unfavorably difficult to perform correction of aberration, particularly, correction of field curvature.

Subsequently, there will be explained a concrete practical example in the present embodiment. The multi-beam scanning optical system 10 in the practical example is shown in FIG. 1. There are shown in Table 1, specifications of the multi-beam scanning optical system 10 in the practical example.

TABLE 1

|  | Practical Example |
|---|---|
| Focal length f of coupling lens group 2 [mm] | 20.000 |
| Fno of coupling lens group 2 | 5.000 |
| Magnification of coupling lens group 2 | −16.280 |
| Distance from light source 1 to coupling lens group 2 [mm] | 18.600 |
| Thickness of coupling lens group 2 [mm] | 4.000 |
| Distance from coupling lens group 2 to deflection mirror [mm] | 105.000 |
| Distance from deflection mirror to object point of coupling lens group 2 [mm] | 345.000 |
| Incident angle on deflection mirror [°] | 45.000 |
| Distance from polygon mirror 4 to object point of coupling lens group 2 [mm] | 658.824 |
| Scanning coefficient K of scanning lens group 5 [mm] | 177.000 |
| Fno of scanning lens group 5 | 60.500 |
| Magnification m of scanning lens group 5 | 0.743 |
| Focal point location at back of image plane of scanning lens group 5 [mm] | 44.900 |
| Scanning width W of scanning lens group 5 [mm] | 216.000 |
| Distance d from deflection mirror to scanning lens group 5 [mm] | 45.000 |
| Magnification M of entire system | −12.100 |
| Distance Δ1 in main scanning direction between laser emitters of light source 1 [mm] | 0.020 |
| Angular amplitude φ of deflection mirror [°] | 15.000 |

Additionally, there are shown in Table 2, each parameter value in the practical example which is calculated based on the specifications shown in Table 1.

TABLE 2

| Condition (1) | |
|---|---|
| Δ1/f · tan(W/4Kφ) | 0.002 |
| Condition (3) | |
| W/2 sin α (upper limit) | 152.735 |
| f(2 − M/m) − K/m | 127.455 |
| (d/K)W/2 sin α (lower limit) | 38.831 |

Figure 5:
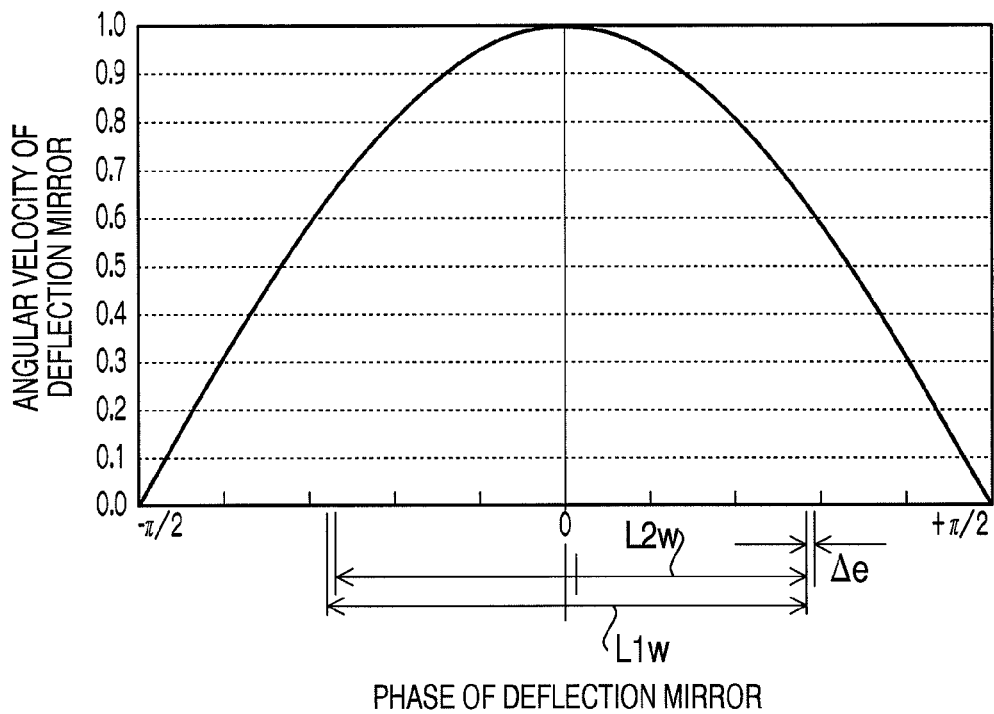
FIG. 5 shows relationship between a phase and an angular velocity of a sine functionally oscillating deflection mirror in a multi-beam scanning optical system in a practical example of the embodiment according to one or more aspects of the present invention.
Figure 6:
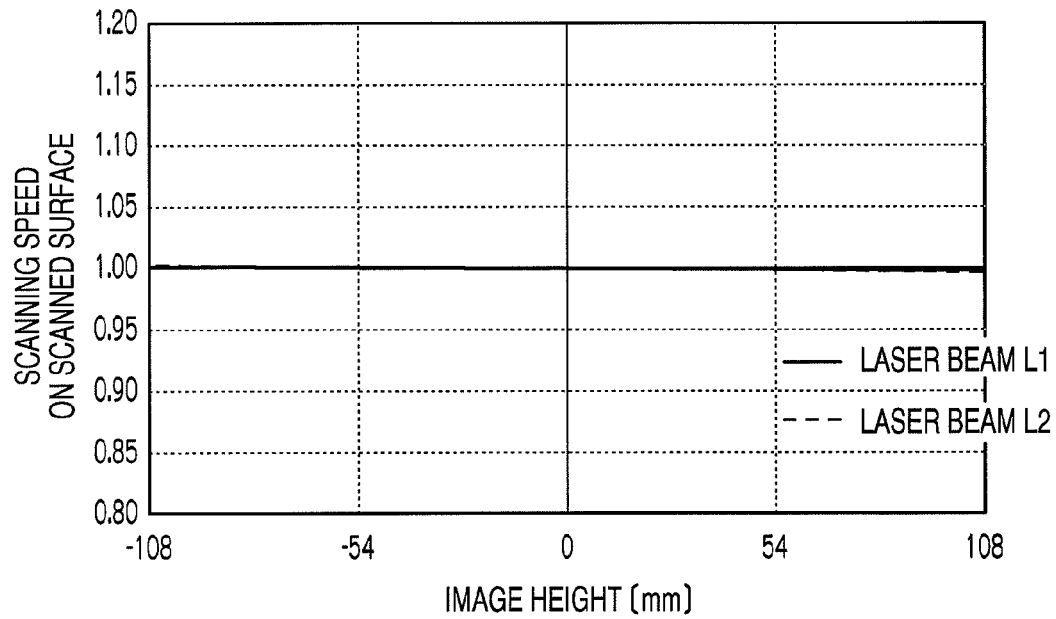
FIG. 6 shows relationship between an image height and a scanning speed on the scanned surface for each laser beam in a multi-beam scanning optical system in the practical example of the embodiment according to one or more aspects of the present invention.

As shown in Tables 1 and 2, the multi-beam scanning optical system 10 in the practical example satisfies the conditions (1) to (6). FIG. 5 shows relationship between the phase and angular velocity of the micro-mirror device 4 of the multi-beam scanning optical system 10 in the practical example. It is noted that a vertical axis of FIG. 5 represents an angular velocity normalized on the basis of the maximum value of the angular velocity at a phase of 0. Further, FIG. 6 shows relationship between the image height and scanning speed of each of the laser beams L1 and L2 on the scanned surface in the practical example. It is noted that a vertical axis of FIG. 6 represents a relative speed (ratio) of the scanning speed of the laser beam L1 to that of the laser beam L2.

As understood from comparison of FIG. 5 with FIG. 3, the multi-beam scanning optical system 10 in the practical example keeps the shift amount Δe between the phase ranges L1w and L2w of the respective laser beams to the minimum. Here, Δe is defined as Δ1/(fφ) (where a unit of φ is radian). In the multi-beam scanning optical system 10 of the practical example, the shift amount Δe, which is 0.038, is kept very small. Thereby, as understood from comparison of FIG. 6 with FIG. 4, in the multi-beam scanning optical system 10 of the practical example, the scanning speed of each laser beam is substantially constant all over the range of image height. Thus, the multi-beam scanning optical system 10 in the practical example has a desired configuration in case where the micro-mirror device is employed as a deflector.

Hereinabove, the embodiment according to aspects of the present invention has been described. However, the present invention is not limited to the aforementioned embodiment. Various sorts of modifications may be possible as far as they are within such a scope as not to extend beyond essential teachings of the present invention.

For example, two laser beams are emitted by the light source in the aforementioned embodiment, yet more beams may be emitted. In addition, the laser emitters may not necessarily be placed on a single chip, as far as a plurality of laser beams emitted by the laser emitters are incident onto common coupling lens group. Furthermore, the function of the cylindrical lens group may be given to the coupling lens group, so that the number of lenses provided between the light source and the deflection mirror can be reduced.

The present disclosure relates to the subject matter contained in Japanese Patent Application No. P2007-091295, filed on Mar. 30, 2007, which is expressly incorporated herein by reference in its entirety.

What is claimed is:

1. A multi-beam scanning optical system configured to scan a plurality of laser beams on a scanned surface in a predetermined scanning direction, comprising:
a light source that includes a plurality of laser emitters spaced from each other in the predetermined scanning direction, each of the plurality of laser emitters being configured to emit a laser beam;
a diverging property changing element configured to change a diverging property of each of the laser beams emitted by the light source;
a deflector configured to be sine-functionally oscillated and to deflect each of the laser beams with the diverging property thereof changed by the diverging property changing element so as to scan each of the laser beams on the scanned surface in the predetermined scanning direction; and
a scanning speed controlling element configured to control a scanning speed at which each of the laser beams deflected by the deflector is scanned on the scanned surface,
wherein the multi-beam scanning optical system is configured to satisfy a condition (1):

$$\frac{\Delta_1 \tan(W/4K\varphi)}{f} < 0.01 \quad (1)$$

where $\Delta_1$ represents a distance in the predetermined scanning direction between any two adjacent laser emitters of the light source,
f represents a focal length of the diverging property changing element,
W represents a scanning width of each of the laser beams on the scanned surface,
K represents a scanning coefficient of the scanning speed controlling element, and
φ represents an angular amplitude of the deflector.

2. The multi-beam scanning optical system according to claim 1,
wherein the diverging property changing element converges each of the laser beams at least in the predetermined scanning direction,
wherein the multi-beam scanning optical system is configured to satisfy conditions (2) and (3):

$$f > -K/M \quad (2)$$

$$\frac{W}{2\sin\alpha} > f(2 - M/m) - K/m > \frac{dW}{2K\sin\alpha}, \quad (3)$$

wherein M represents a magnification of the entire multi-beam scanning optical system in the predetermined scanning direction,
α represents an angle, on a scanning plane of the laser lights deflected by the deflector in the predetermined scanning direction, between an optical axis of an optical system provided between the light source and deflector and an optical axis of the scanning speed controlling element,
m represents a magnification of the scanning speed controlling element in the predetermined scanning direction, and
d represents a distance between the deflector and a first surface of the scanning speed controlling element.

3. The multi-beam scanning optical system according to claim 2, which is configured to satisfy a condition (4):

$$-K/M > 6 \quad (4).$$

4. The multi-beam scanning optical system according to claim 2, which is configured to satisfy conditions (5) and (6):

$$0.15 < m < 1.5 \quad (5)$$

$$W/2 < K \quad (6).$$

5. The multi-beam scanning optical system according to claim 3, which is configured to satisfy conditions (5) and (6):

$$0.15 < m < 1.5 \quad (5)$$

$$W/2 < K \quad (6).$$

6. The multi-beam scanning optical system according to claim 1,
wherein the diverging property changing element includes a diverging property changing lens group.

7. The multi-beam scanning optical system according to claim 1,
wherein the deflector includes a micro-mirror device.

8. The multi-beam scanning optical system according to claim 1,
wherein the scanning speed controlling element includes a scanning speed controlling lens group.

* * * * *